(12) United States Patent
Noe

(10) Patent No.: US 6,665,106 B2
(45) Date of Patent: Dec. 16, 2003

(54) METHOD FOR OPTICAL POLARIZATION CONTROL

(76) Inventor: Reinhold Noe, Helmerner Weg 2, Paderborn (DE), 33100

(*) Notice: Subject to any disclaimer, the term of this patent is extended or adjusted under 35 U.S.C. 154(b) by 21 days.

(21) Appl. No.: 09/864,937

(22) Filed: May 25, 2001

(65) Prior Publication Data

US 2002/0015213 A1 Feb. 7, 2002

(30) Foreign Application Priority Data

May 26, 2000 (DE) .......................... 100 26 240

(51) Int. Cl.[7] .............................. G02F 1/03; G02B 27/28
(52) U.S. Cl. .................... 359/254; 359/483; 359/484; 359/256; 359/251; 359/252; 359/320; 359/301; 385/8; 385/11
(58) Field of Search ................... 359/483, 484, 359/254, 256, 251, 252, 245, 301, 320; 385/8, 11

(56) References Cited

U.S. PATENT DOCUMENTS 5,212,743 A * 5/1993 Heismann .................... 359/484

OTHER PUBLICATIONS

IEEE J. Quant. Electronis 18 (1982) 4, pp. 767–771, "Integrated–Optical Single–Sideband Modulator and Phase Shifter." by Heismann et al.
IEEE J. Lightwave Techn. 6 (1988) 7, S.1199–1207 "Endless Polarization Control Systems for Coherent Optics." by Noé et al.
IEEE J. Lightwave Techn. 8 (1990) 3, S. 438–458 "Polarization Control for Coherent Communications" by Walker et al.
Electron. Lett. 27 (1991) 4, S.377–379 "Broadband Reset-Free Automatic Polarisation Controller" by Heismann et al.
Europ. Conf. on Optical Communications 1993, Montreux, Schweiz, S.401–404, Beitrag We P9.3.
Proc. Fourth Europ. Conference on Integrated Optics ECIO 87, Glasgow, Schottland, S.115–118.

* cited by examiner

Primary Examiner—Evelyn Lester

(57) ABSTRACT

The invention specifies a method and apparatus for optical polarization control which enable non-ideal component behavior to be corrected by means of a calibration table. This ensures shorter constructional length, lower operating voltages or higher level functions (ER instead of GSBA).

12 Claims, 4 Drawing Sheets

METHOD FOR OPTICAL POLARIZATION CONTROL

CLAIM FOR PRIORITY

This application claims priority to Application No. 10026240.6 which was filed in the German language on May 26, 2000.

TECHNICAL FIELD OF THE INVENTION

The invention relates to a method for optical polarization control, and in particular, to endless polarization control of an optical signal.

BACKGROUND OF THE INVENTION

For optical polarization control, polarization transformers are particularly suitable, preferably those of an electro-optical principle of operation. These transformers typically include one or more polarization actuators, the modes of which can be varied endlessly, i.e. without interruption, on a great circle of the Poincaré sphere. Examples of this are known from IEEE J. Quantum Electronics 18(1982)4, pp. 767–711, from IEEE J. Lightwave Techn. 6(1988)7, pp. 1199–1207, from IEEE J. Lightwave Techn. 8 (1990) 3, pp. 438–458, from Electron. Lett. 27(1991)4, pp. 377–379, and from the minutes of the European Conference on Optical Communications 1993, Montreux, Switzerland, pp. 401–404, contribution WeP9.3.

In practice, non-ideal behavior of polarization actuators can impede the capability for endless, uninterrupted polarization tracking which is always the aim. In IEEE J. Lightwave Techn. 8(1990)3, pp. 438–458, it was specified how this problem can be solved purely quantitatively, i.e. by adding another electro-optical polarization actuator. More elaborate tests have shown, however, that only one additional polarization actuator is hardly sufficient in practice.

In IEEE J. Lightwave Techn. 6(1988)7, pp. 1199–1207, a solution to solving this problem is to use a calibration table in a manner which provides the maximum control speed per control step. This can be disadvantageous, however, in that the constructional length of the polarization transformer normally required is distinctly increased by adding a further polarization actuator to an original electro-optical polarization actuator which sufficient in the ideal case, and is even double in this case. As an alternative, the control voltages could be distinctly increased while keeping the total construction length unchanged. Both methods contradict the usual requirements for low supply voltages and short constructional length for the purpose of avoiding DC drift and optical insertion losses. Using this technique, the further polarization actuator is driven as a function of the parameters of the original one. In the nomenclature used there, a phase angle difference, occurring for d3=0, d4=0, of d2'= atan2(f4(d2), f3(d2)) (atan2=arcfunction, known for example from the programming languages Pascal, C, Matlab) of the further actuator which occurs in the case of input polarization P1, which is circular here, between this and a proportion of output polarization P2 (which is orthogonal thereto and is thus oppositely circular here), is also a function of a corresponding phase angle difference d2 of the original one which is accounted for by a calibration table. Since figure 15 there is a twisted curve, the problem arises that atan2(f4(d2),f3(d2)) and d2 can differ, for example by an odd-number multiple of $\pi$. In these cases, the total delay of the polarization transformer formed by the two polarization actuators is obtained by subtracting the delay d1 of the original one and the delay sqrt $(f3(d2)^2+f4(d2)^2)$ of the further polarization actuator. That is, d1-sqrt$(f3(d2)^2+f4(d2)^2)$ for d1>sqrt$(f3(d2)^2+f4(d2)^2)$. This destructive interplay is the reason why a large constructional length and/or high control voltages are needed in accordance with the prior art. If the method specified is properly performed, atan2(f4(d2),f3(d2)) will change by $4\pi$ or d2 by $2\pi$ so that the amount |atan2(f4(d2),f3(d2))−d2| of the difference atan2 (f4(d2),f3(d2))−d2 can grow without limits if d2 grows arbitrarily, e.g. by many times $2\pi$. In particular, the discussed destructive interplay occurs there, for example with d2=0.7*$\pi$, d2=1.3*$\pi$ and d2=1.8*$\pi$.

Since this phase angle difference (d2 or atan2(f4(d2),f3 (d2))) in each case represents an angle coordinate from an eigenmode of the polarization actuator on a great circle on the Poincaré sphere, the words angle coordinate will be used synonymously with this phase angle difference in the text which follows.

In IEEE J. Lightwave Techn. 6(1988)7, pp. 1199–1207, an electro-optical polarization transformer for transforming a particular one into any arbitrary polarization state or conversely has been described; such polarization transformers could be abbreviated by GSBA (Generalized Soleil Babinet Analogue). Polarization transformers for transforming any arbitrary polarization state into any arbitrary one will be abbreviated by ER (Elliptical Retarder) in the text which follows. ERs with calibration table(s) for compensating for non-ideal component behavior have not previously been known. This is especially true of ERs that necessitate a short constructional length since, compared with GSBAs, ERs already need twice the constructional length in the ideal case.

In Proc. Fourth European Conference on Integrated Optics ECIO 87, Glasgow, Scotland, pp. 115–118, a GSBA is specified with many sections and fixed angle coordinate differences (For example: $\alpha*\pi/2$ between adjacent electrodes, where $\alpha=\Lambda DEV/\Lambda BEAT$), which are only dependent on the wavelength but not on the desired polarization transformation, of different sections. Correspondingly, this GSBA also does not have a calibration table for compensating for non-ideal behavior.

SUMMARY OF THE INVENTION

In one embodiment of the invention, there is a method for endless polarization control of an optical signal. The method includes, for example, converting a polarization of the optical signal using polarization acutuators, with arbitrary, freely and interruption free selectable individual phase angle differences as individual angle coordinates, at least partially into a respective orthogonal, which together form a polarization transformer with a total delay and a total phase angle difference as a total angle coordinate between the polarization and a respective orthogonal, in which an individual angle coordinate is varied as a function of another angle coordinate, wherein the amount (|d$\zeta$1|, |d$\zeta$2|, |d$\zeta$|, |d$\zeta$*(2*i−n−1)/(n−1)|) of the variation (d$\zeta$1, d$\zeta$2, d$\zeta$, d$\zeta$*(2*i−n−1)/(n−1)) of an individual angle coordinate is limited for sequences of desired polarization transformations.

In another aspect of the invention, individual delays support each other in their effects (($\psi$1'>$\psi$1, $\psi$'>$\psi$2), ($\psi$>$\psi$1, $\psi$>$\psi$2)) by the limitation of the amount (|d$\zeta$1|, |d$\zeta$2|, |d$\zeta$|, |d$\zeta$*(2*i−n−1)/(n−1)|) of the variation (d$\zeta$1, d$\zeta$2, d$\zeta$, d$\zeta$* (2*i−n−1)/(n−1)).

In another aspect of the invention, the another angle coordinate is the actual or attempted total angle coordinate or an attempted individual angle coordinate.

In yet another aspect of the invention, a number of individual angle coordinates are varied as a function of the another angle coordinate.

In another aspect of the invention, at least in the case of equal attempted individual angle coordinates, one of the variations of individual angle coordinates is equal to the negative of another one of the variations or equal to zero.

In another aspect of the invention, at least one of the individual delays is varied as the function of another angle coordinate.

In still another aspect of the invention, one of the variations of the individual delays is equal to another one of the variations or equal to zero, at least in the case of equal attempted individual delays.

In another aspect of the invention, the method includes applying, to at least two additional polarization actuators, which are located before or after the polarization actuators in the beam path to produce another polarization transformer and form an elliptical retarder.

In another aspect of the invention, one of the polarization actuators operates as an electrooptical Soleil Babinet compensator which can convert circular polarizations at least partially into one another.

In yet another aspect of the invention, at least two additional polarization actuators producing an additional polarization transformer form an elliptical retarder with the polarization transformer.

In another aspect of the invention, at least one of the polarization actuators operates as an electrooptical Soleil Babinet compensator, the polarizations which are at least partially converted being circular polarizations.

In another aspect of the invention, at least one of the polarization actuators operates as an electrooptical Soleil Babinet analog, the polarizations which are at least partially converted being TE and TM polarizations.

BRIEF DESCRIPTION OF THE DRAWINGS

The invention will be explained in greater detail with reference to exemplary embodiments, in which.

DETAILED DESCRIPTION OF THE INVENTION

The invention specifies a method for optical polarization control which enable non-ideal component behavior to be corrected by means of calibration table but ensure shorter constructional length, lower operating voltages or higher level functions (ER instead of GSBA) than the prior art.

In one embodiment of the invention, a polarization actuator is divided into at least two sections, the angle coordinate difference(s) and relative total delay of which can be varied by restricted amounts. In this manner, a functionality is achieved essentially within the constructional length or with the control voltages of the original GSBA which is sufficient. This could only be achieved in the prior art by another GSBA, resulting in noticeably increased constructional length and/or control voltages. The inventive concept is also suitable for equipping a known ER with calibration tables for compensating for non-ideal behavior.

Figure 1:
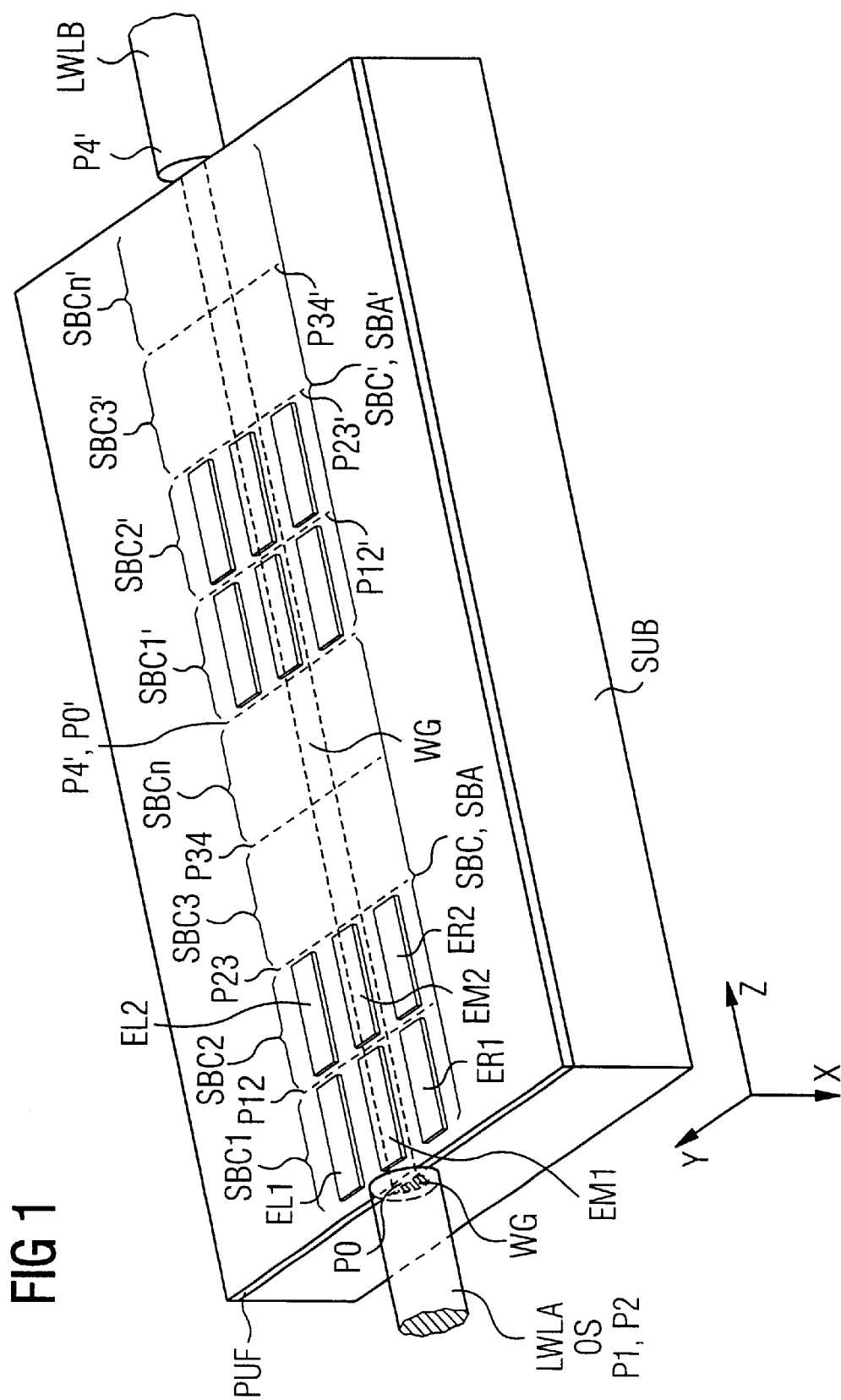
FIG. 1 shows a basic configuration of a polarization transformer in accordance with the method of the invention.
Figure 2:
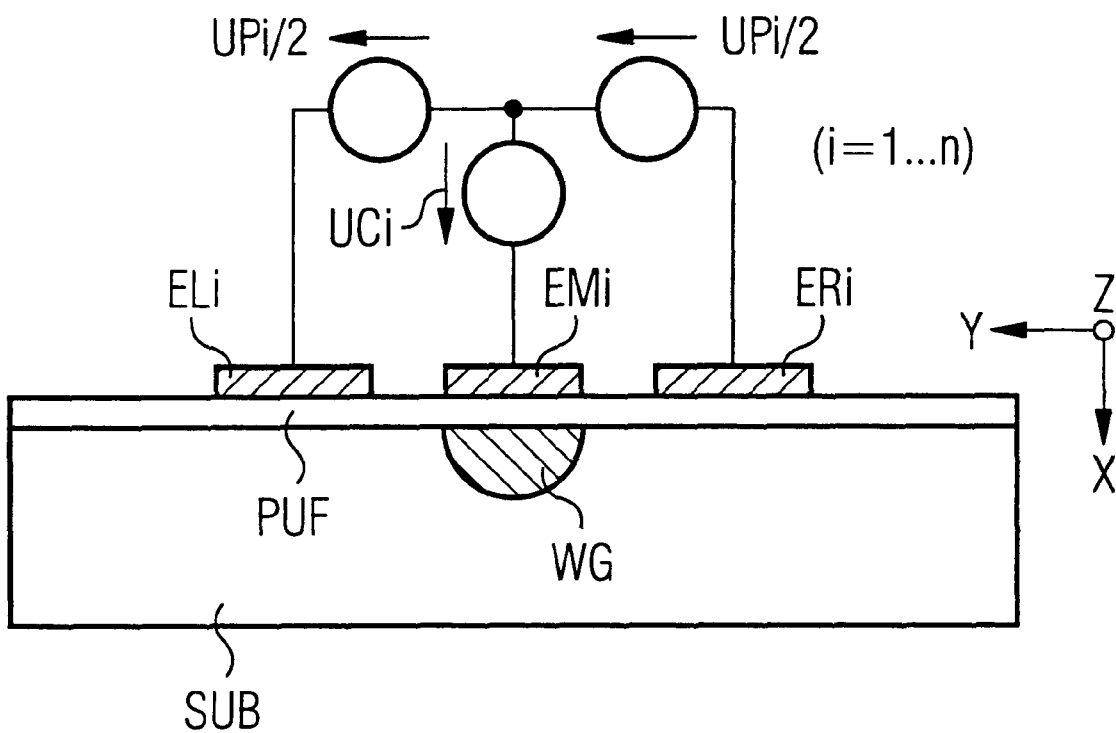
FIG. 2 shows a cross sectional area of the polarization transformer.

FIG. 1 shows a polarization transformer of a lithium niobate crystal with X section and Z direction of propagation according to the invention.

An optical signal OS which, if necessary, can be split into components of two polarizations P1, P2, is coupled in via optical waveguide LWLA and coupled out via optical waveguide LWLB or conversely in the case of the signal passing in the opposite direction. A waveguide WG was generated in the crystal SUB by indiffusion of titanium. On the crystal, an insulating buffer layer PUF, for example of silicon dioxide, can be applied but is not required. Just like the crystal, it is transparent at the operating wavelength.

Conducting electrodes $ELi$, $EMi$, $ERi$ ($i=1 \ldots n$) are vapor deposited on the buffer layer or on the crystal. In the present case, $n=4$ although other values may be used. These electrodes can include metal, for example aluminum, but also of transparent conductive materials such as indium tin oxide (ITO).

The electrodes $ELi$, $EMi$, $ERi$ are segmented so that, for example, there are $n=4$ polarization actuators $SBCi$ ($i=1 \ldots n$; SBC stands for electrooptical Soleil Babinet compensator). The polarization at the end of SBC1 facing the LWLA is assumed to be P0 and for that at the end of SBCn facing the LWLB is assumed to be Pn ($n=4$). That is, P4, the polarization occurring between SBCj and SBC(j+1) ($j=1 \ldots (n-1)$) is assumed to be Pj(j+1), for example, P12, P23, P34. The center electrodes $EMi$ are located above the waveguide, left and right electrodes $ELi$, $ERi$ are mounted in parallel on both sides of the waveguide WG. Individual electrodes of different segments can also be connected to one another, for example all electrodes $EMi$. By applying opposite voltages $UPi$ ($i=1 \ldots n$) between the outer electrodes $ERi$, $ELi$, a differential phase shift is generated between the transverse electrical (TE) and the transverse magnetic (TM) waves. Due to unavoidable waveguide birefringence, voltage values $UPi0$ differing from zero of the voltages $UPi$ are required, as a rule, in order to achieve phase matching, i.e. a vanishing TE-TM phase shift. Instead of the Z direction of propagation, therefore, other directions of propagation can also be selected which approximate the Z axis up to a few degrees. This allows the waveguide birefringence to be compensated for approximately with the aid of the slightly birefringent crystal cut. As a general rule, voltage values $UPi0$ not equal to zero are required for phase matching because this compensation is generally incomplete. Applying voltages $UCi$ ($i=1 \ldots n$) of the same sense compared with the center electrode $EMi$ to the outer electrodes $ELi$, $ERi$ provides TE-TM mode conversion. With a vanishing voltage $UCi$, the mode conversion is ideally equal to zero, but even with a slight lateral displacement of the electrodes in the Y direction compared with the waveguide, a voltage $UCi0$ may be necessary for this. By combining the voltages $UPi$ and $UCi$ of the opposite sense and of the same sense, any arbitrary combination of TE-TM phase shift and TE-TM mode conversion can be achieved. Such a polarization actuator is also called an electro-optical Soleil Babinet compensator SBC. The delay $\psi i$ of the SBCi is obtained by geometric addition of the TE-TM phase shift without mode conversion and the TE-TM mode conversion without phase shift. That is, $\psi i = \mathrm{sqrt}((bb*(UCi-UCi0))^2 + (aa*(UPi-UPi0))^2)$.

In the text which follows, the delay $\psi i$ is understood to be positive; negative delays are represented by positive ones with respect to exchanged eigenmodes. The constants aa, bb are determined by overlap integrals between electrical and optical fields. An SBC acts as linear optical wave plate with a delay $\psi$ with orthogonal, linearly polarized eigenmodes. The tangent of $\zeta$ doubled of a physical angle of elevation $\zeta/2$ of one of these eigenmodes is the ratio $(bb*(Uci-UCi0))/(aa*(Upi-UPi0))=\tan\zeta$. $\zeta$ can be called the angle coordinate $\zeta$ which identifies the angle position of an eigenmode on the S1-S2 great circle (equator) of the Poincaré sphere. As already noted, UCi0 is equal to zero in the ideal case. An electro-optical wave plate with delay $\psi$ and angle coordinate $\zeta$ needs cosinusoidal or sinusoidal voltages $Upi=(\psi i/aa)*\cos\zeta i+UPi0$, $Uci=(\psi i/bb)*\sin\zeta i+UPi0$ of certain amplitudes $(\psi i/aa)$, $(\psi i/bb)$ with offsets UPi0, UPi0 as a function of $\zeta$. An SBC produces a mode conversion between two oppositely circular polarizations P1, P2 (defined with suitable constant phase angles), a freely selectable phase shift $\zeta$ occurring between converted and unconverted signal components.

Figure 5:
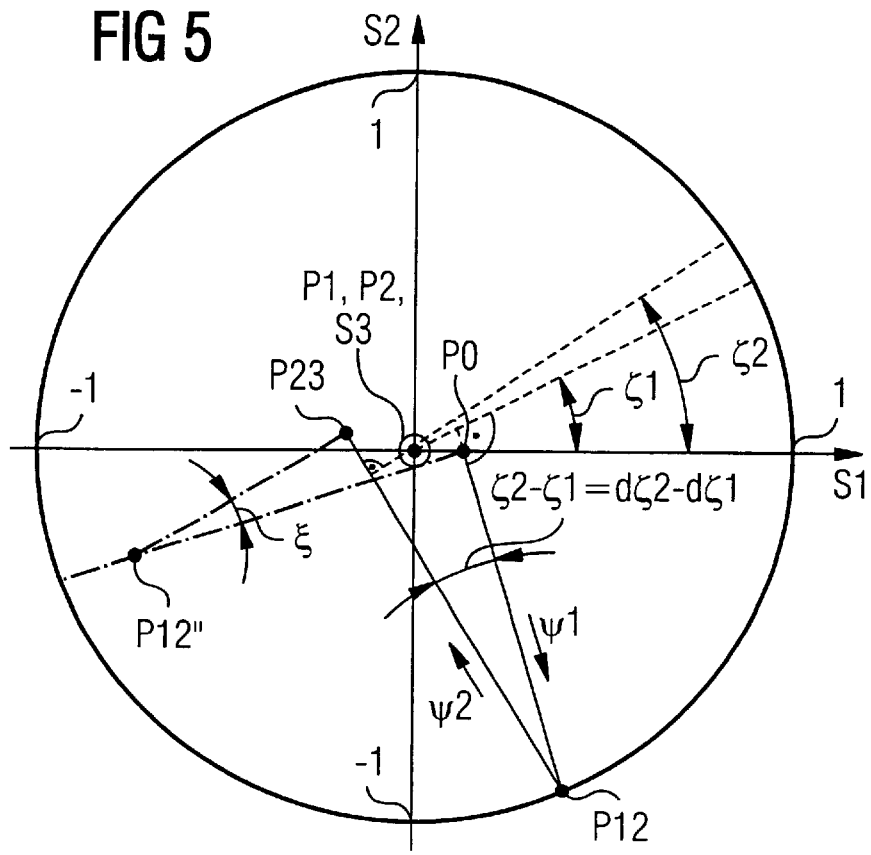
FIG. 5 shows a section through a Poincaré sphere and polarization transformers according to the invention.
Figure 6:
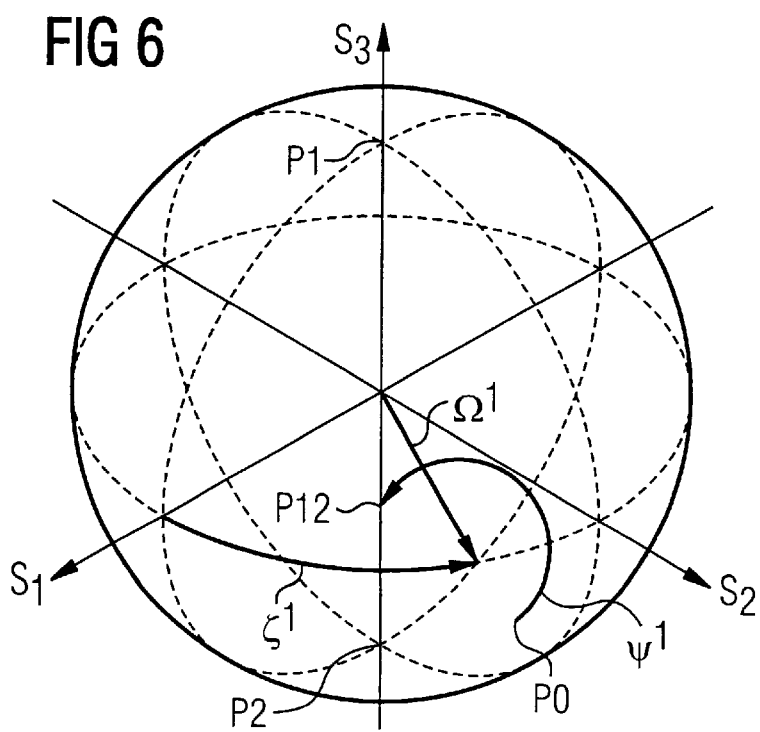
FIG. 6 shows a Poincaré sphere for the illustration of polarization transformers.

This phase delay or phase shift $\zeta$ between converted and unconverted signal components describes the physical behavior of a mode converter, such as an SBC in this case. When the Poincaré sphere is used, $\zeta$ is an angle coordinate on a great circle, in this case the equator great circle. This is explained by with reference to FIG. 6 for SBC1. Its input polarization P0 is changed into its output polarization P12 by rotation about an axis $\Omega1$. The axis passes through the center point of the Poincaré sphere and a great circle identified by this angle coordinate $\zeta1$ at the relevant position, about an angle $\psi1$ which is equal to the delay $\zeta1$ of the polarization actuator SBC1. In FIG. 6, $\psi1$ is approximately equal to $\pi$. For an SBC, the two polarizations P1, P2 which can be converted to one another are circular polarizations. The axes of the Poincaré sphere are the normalized Stokes parameters S1, S2, S3. FIG. 5 shows the Poincaré sphere in a top view of the plane to which the connecting straight line between P1 and P2 is perpendicular, that is to say in this case the equator plane which is identified by S3=0.

In the case of polarization actuators which are here called generalized Soleil Babinet analogs (GSBA), the great circle which identifies an eigenmode of a polarization actuator by means of the angle coordinate $\zeta$ is an arbitrary great circle of the Poincaré sphere which is in a plane to which the connecting straight line between P1 and P2 is perpendicular.

In a first exemplary embodiment of the invention, only SBC1 and SBC2 are used. If $\zeta1=\zeta2$, SBC1 and SBC2 together act like an SBC with angle coordinates $\zeta=\zeta1=\zeta2$ and delay $\psi=\psi1+\psi2$. As an endless polarization transformer which can generate any arbitrary polarization from a circular input polarization (or conversely), endless adjustability of $\psi$ and a delay $\zeta$ which can be adjusted between 0 and $\pi$ is sufficient in the ideal case according to the prior art. To compensate for non-ideal behavior, two degrees of freedom are necessary. According to the invention, $\psi1=(1+d\psi1(\zeta1'))*\psi1'$, $\psi2=(1+d\psi2(\zeta2'))*\psi2'$, $\zeta1=\zeta1'+d\zeta1(\zeta1')$, $\zeta2=\zeta2'+d\zeta2(\zeta2')$ are selected, where $\psi1$, $\psi2$, $\zeta1$, $\zeta2$ are the delays or angle coordinates from which the electrode control voltages of SBC1, SBC2 are calculated. $\psi1'$, $\psi2'$, $\zeta1'$, $\zeta2'$ are the corresponding quantities aimed for by the user from which $\psi1$, $\psi2$, $\zeta1$, $\zeta2$ differ in practice due to non-ideal. component behavior. $d\psi1$, $d\psi2$ are dimensionless relative delay changes which are specific for SBC1 and SBC2, respectively, in accordance with which—in this case multiplied by $\psi1'$ and $\psi2'$, respectively, $\psi1$, $\psi2$ differ from $\psi1'$, $\psi2'$. $d\zeta1$, $d\zeta2$ are angles specific for SBC1, SBC2 by which $\zeta1$, $\zeta2$ differ from $\zeta1'$ and $\zeta2'$, respectively, in the case of $\psi1'+\psi2'=\pi$, $\psi1'=\psi2'=\pi/2$ being advantageous in this case.

$d\psi1$, $d\psi2$, $d\zeta1$, $d\zeta2$ in each case depend periodically on the respective argument, an angle coordinate, with $2\pi$. For example, they are simply determined as follows: circular polarization is selected as input polarization of SBC1. Firstly, $d\psi1=0$, $d\psi2=0$, $d\zeta1=0$, $d\zeta2=0$ is assumed for all angle coordinates. Then the desired total delay $\psi'$ of the Soleil Babinet compensator SBC formed by SBC1 and SBC2 is set to be equal to $\psi'=\pi$ and distributed uniformly to SBC1, SBC2 according to $\psi1'=\psi2'=\psi'/2$ but other ratios of dividing are also possible, and $\zeta1'=\zeta2'=\zeta'$ is selected to be equal to the desired angle coordinates $\zeta'$ of this SBC. An ideal SBC will generate with $\psi'=\pi$ for all $\zeta'$, from a circular input polarization the circular output polarization orthogonal thereto. Under non-ideal conditions, which can include non-ideal behavior of SBC1, SBC2 and insufficient accurate knowledge of the input polarization of SBC1 and the output polarization of SBC2, as a rule SBC1, SBC2 will do this approximately but not accurately. The parameters $d\psi1$, $d\psi2$, $d\zeta1$, $d\zeta2$ are then varied until the output polarization of SBC2 is the circular polarization which is orthogonal to the input polarization. This simple optimization task only needs two of the four degrees of freedom. The remaining ones are eliminated, for example by $d\psi(\zeta')=d\psi1(\zeta')=d\psi2(\zeta')$ and $d\zeta(\zeta')=d\zeta1(\zeta')=-d\zeta2(\zeta')$ for all $\zeta'$. The function values $d\psi1(\zeta')$, $d\psi2(\zeta')$, $d\zeta1(\zeta')$, $d\zeta2(\zeta')$ have thus been unambiguously determined for the selected value $\zeta'$. This procedure is then repeated for all $\zeta'$ between 0 and $2\pi$ in a sufficiently dense grid so that $d\psi1(\zeta')$, $d\psi2(\zeta')$, $d\zeta1(\zeta')$, $d\zeta2(\zeta')$ are known for $0\leq\zeta'\leq2\pi$. In practice, 32 or 64 nodes are normally sufficient. $d\psi1(\zeta')$, $d\psi2(\zeta')$, $d\zeta1(\zeta')$, $d\zeta2(\zeta')$ form characteristic calibration tables for the function of SBC1, SBC2. Between the nodes, linear interpolation, for example, is possible. So if $\psi1'=\psi2'=\psi'/2$, $\zeta1'=\zeta2'=\zeta'$ and $\psi1$, $\psi2$, $\zeta1$, $\zeta2$ are selected in dependence on this and on $d\psi1$, $d\psi2$, $d\zeta1$, $d\zeta2$, then SBC1, SBC2 together form a polarization transformer which acts like an ideal Soleil Babinet Compensator, at least in all respects which are significant for the endless uninterrupted polarization tracking. By dividing the total delay into a number of SBCs, in this case 2 SBCs, the total constructional length and required control voltages do not need to be larger than in an ideal SBC, or only insignificantly so. Unlike what has been described above, $d\zeta1(\zeta')=0$, for example, can be selected for all $\zeta'$ to eliminate one of the two superfluous degrees of freedom, especially if there is a fixed generated or analyzed polarization at the input of SBC1 or, for example, $d\zeta2(\zeta')=0$ can be selected for all $\zeta'$ especially if there is a fixed analyzed polarization or one to be generated at the output of SBC2. The other superfluous degree of freedom can also be eliminated differently from what has been described above, for example by $d\psi1(\zeta')=0$ or alternatively, by $d\psi2(\zeta')=0$, in each case for all $\zeta'$.

If there is interest not only in certain polarization transformations of one polarization state but a number of polarization states, one of the previously superfluous two degrees of freedom can be used for precisely adjusting the eigenmodes of the polarization transformer. In this case, a number of input polarizations must be applied for each operating point and a number of output polarizations must be analyzed so that the Müller or Jones matrix of the polarization transformer is obtained and it is possible to predetermine with its delay and with angle of elevation and ellipticity angle of its eigenmodes, three quantities which are reached by the choice of $d\psi1(\zeta')$, $d\psi2(\zeta')$, $d\zeta2(\zeta')$. This requires independent $d\zeta1(\zeta')$, $d\zeta2(\zeta')$. The third degree of freedom required is obtained as above, for example by dψ(ζ')=dψ1(ζ')=dψ2(ζ') or by dψ1(ζ') if dψ2(ζ')=0, or by dψ2(ζ') if dψ1(ζ')=0, or another linear combination of dψ1(ζ'), dψ2(ζ').

Figure 3:
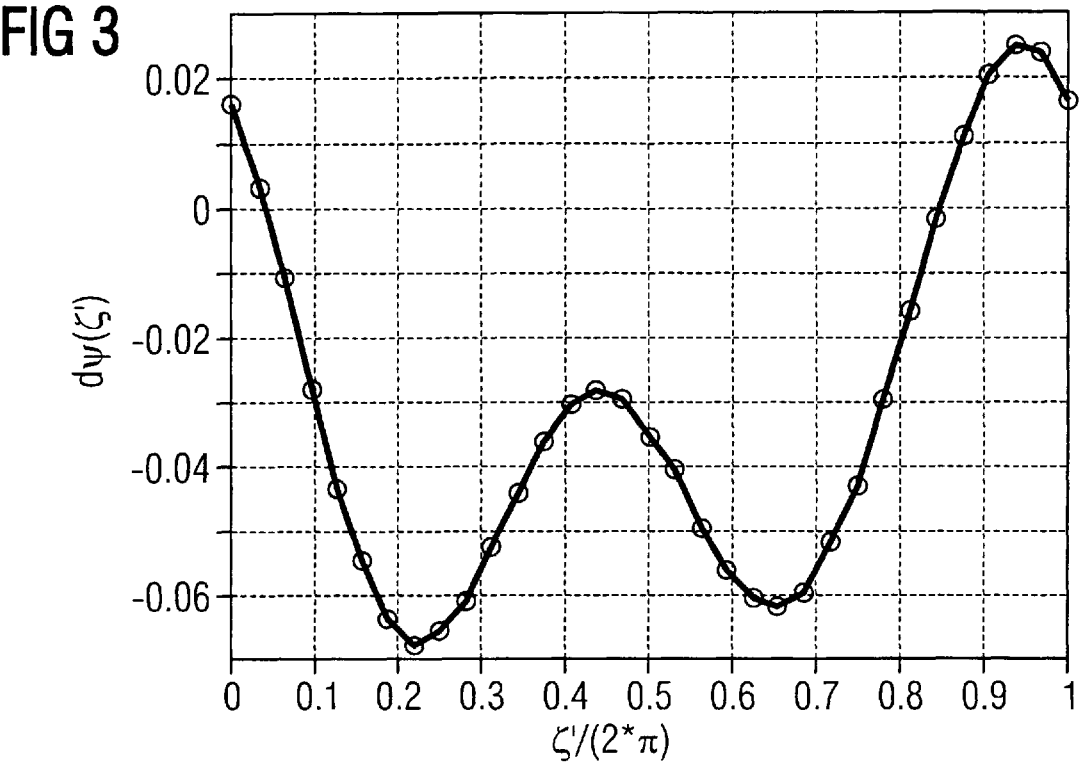
FIG. 3 shows a function which specifies the relative variation of delays.
Figure 4:
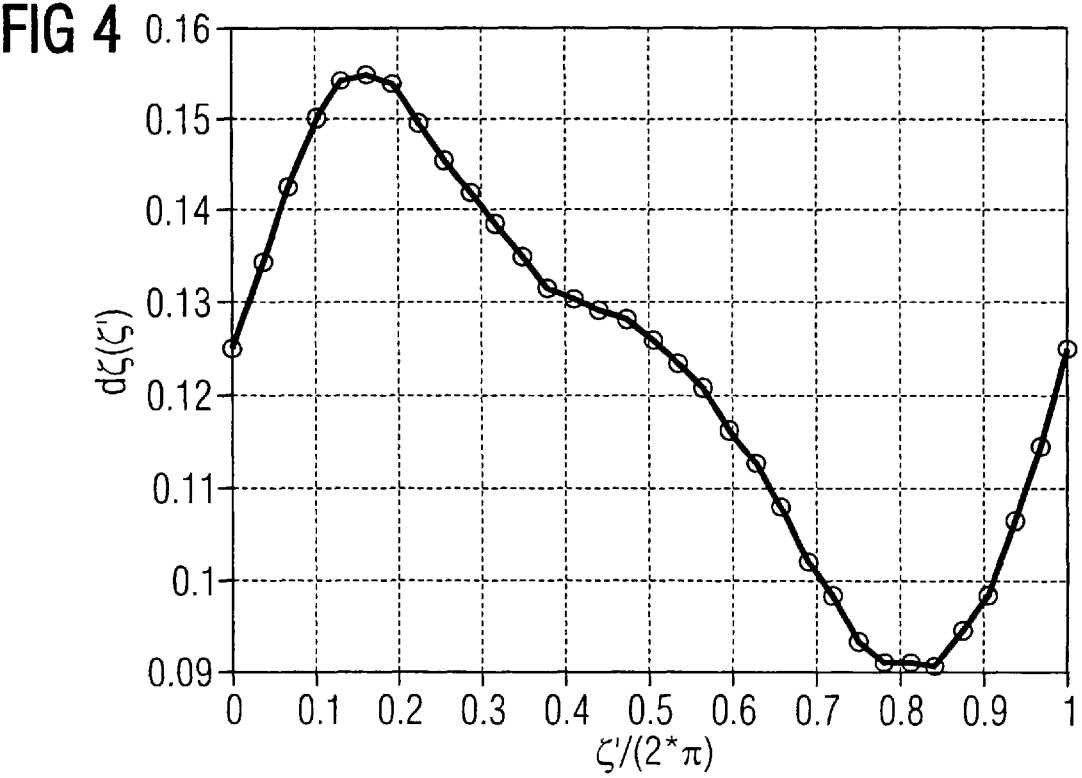
FIG. 4 shows a function which specifies the relative variation of angle coordinates.

FIG. 3 shows dψ(ζ')=dψ1(ζ')=dψ2(ζ') and FIG. 4 shows dζ(ζ')=dζ1(ζ')=−dζ2(ζ') in each case as a function of ζ' with 0≦ζ'≦2π and 32 nodes in this interval; these functions were measured on a real component. Using these functions dψ(ζ'), dζ(ζ') made it possible to reduce the deviations of the output polarization of SBC2 from the orthogonal of the input polarization by more than a factor of 3 (in radiance) in the operational case of circular input polarization at the input of SBC1, ψ'=π, 0≦ζ'≦2π. Since polarization errors (in radiance) have an approximately quadratic effect on intensities and other quantities relevant to the system, the method results in a reduction of errors relevant to the system by a factor of approximately 10. The maximum value of dψ(ζ') of less than 0.05 shows that required control voltages were less than 5% above the value which they should assume in an ideal SBC which would be constructed to be as long as SBC1 and SBC2 together. From the mean value of dζ(ζ') which differs from 0 can be seen that the method is also capable of compensating for systematic non-ideal behavior such as must occur, for example, by lateral offset of the electrodes above the waveguide in one of the SBC1, SBC2.

Instead of the functions ψ1=(1+dψ1(ζ1'))*ψ1', ψ2=(1+dψ2(ζ2'))*ψ2', ζ1=ζ1'+dζ1(ζ1'), ζ2=ζ2'+dζ2(ζ2') specified above, which have an advantageous effect especially for ψ1'=ψ2'=ψ'/2 where ψ'=π and ζ1'=ζ2'=ζ', that is to say in the case of a complete mode conversion between circular polarizations. P1, P2 during the traverse through SBC1, SBC2, other ones can also be considered. Essentially, it should be ensured that, in the case of a complete mode conversion ψ'=π, it is possible to select any angle coordinates ζ'. In the above formulae, for example, ψ1'=(1/2)*ψ2'=ψ'/3 and/or ζ1'=ζ'2+0.1=ζ' can be considered. Other basic formulae such as ψ1=ψ1'+dψ1(ζ1')/(1+(ψ'−π)^2), ψ2=ψ2'+dψ2(ζ2')/(1+(ψ'−π)^2) and/or ζ1=ζ1'+dζ1(ζ1')/(1+(ψ'−π)^2, ζ2=ζ2'+dζ2(ζ2')/(1+(ψ'−π)^2) can also be considered however, because in these and other possible embodiments of the invention due to the above, variations of ζ1, ζ2 occur (here: dζ2(ζ1')/(1+(ψ'−π)^2), dζ2(ζ2')/(1+(ψ'−π)^2) instead of dζ1(ζ1'), dζ2(ζ2')) and of ψ1, ψ2 (here: dψ1(ζ1')/(1+(ψ'−π)^2), dψ2(ζ2')/(1+(ψ'−π)^2) instead of dψ1(ζ1')*ψ1', dψ2(ζ2')*ψ2') with amounts which are in each case limited, at least in the case of ψ'=π.

The inventive principle will be explained further with reference to FIG. 5 which is a Poincaré sphere in section. Here, an approximately circular input polarization P0, represented by a point on the lower half of the Poincaré sphere, at the input of SBC1, is to be converted approximately into oppositely circular polarization P23, represented by a point on the upper half of the Poincaré sphere, at the output of SBC2. Circular polarizations P1, P2 are located in the lower and upper half, respectively, of the sphere at S1=0, S2=0, S3=±1. Since it is difficult to represent a non-ideal behavior of polarization actuators graphically, a case was selected in which P0 is not equal to P1 and P23 is not equal to P2, for example due to inaccurate measuring devices. For the sake of simplicity, the delay ψ1 of SBC1 was selected in such a way that the polarization P12 at the output of SBC1 is linear, i.e. located on the plane of intersection of the Stokes parameters S1 and S2 with the surface of the sphere. The transformation for SBC1 and its axis of rotation which is orthogonal thereto and which is given by angle coordinate ζ1 on the S1-S2 great circle of the Poincaré sphere, is drawn in. From P12 to P23, SBC2 transforms with delay ψ2 about the axis of rotation given by angle coordinate ζ2. If P0=P1 and P1=P23, ζ1 should and have to be =ζ2. In the case drawn, however, a small angle coordinate difference ζ2−ζ1= dζ2−dζ1 or variation thereto is required.

In FIG. 5, another possible polarization transformation is also drawn via an alternative polarization P12" at the output of SBC1. In this case, ψ1 and ψ2 are clearly different so that P12" is not located on or in the vicinity of the S1-S2 great circle. This illustrates that, of the four degrees of freedom offered by ψ1, ψ2, ζ1, ζ2, one is available for a selected angle coordinate, two are available for achieving the desired polarization transformation and a last one is available for other purposes, in this case the latitude angle (angle between point and S1-S2 great circle) of P12 or P12". The value ζ now required, of the quantity ζ2−ζ1=dζ2−dζ1 differs from the one previously found which is also permissible since, of course, ζ1, ζ2 have different values than previously. It can also be seen that, for example for all possible ζ1, as a function of which dζ1(ζ1), dζ2(ζ1), dψ1(ζ1), dψ2(ζ1) are assumed to be specified, and choice of points P12 on or in the vicinity of the S1-S2 great circle, differences ζ2−ζ1= dζ2−dζ1 of a few tenths radiance at a maximum will be obtained. If, e.g. dζ2=−dζ1, it can also be seen immediately, as a result, that dζ1, dζ2 have limited amounts for all ζ1. Furthermore, FIG. 5 shows that inaccurate measuring devices can be rendered harmless by the method according to the invention, as can non-ideal behavior of polarization actuators. Finally, it can be seen from the position of P12", that this results in a greater angle ζ than would be the case with a position of P12" on the same straight line, originating from P0 and produced by projection, on the point of intersection with the S1-S2 great circle. To be able to keep this angle as small as possible, the choice ψ1=ψ2 or ψ1'=ψ2 ' or the choice of polarization P12 on the S1-S2 great circle is therefore especially advantageous in practice.

If an SBC to be placed into an ideal state by applying the method includes more than two individual SBCs, e.g. of SBC1 . . . SBCn (n>2), the method can be easily designed for this purpose. Due to the greater number of individual SBCs, more degrees of freedom are obtained which, as a rule, will be eliminated by suitable design of functions. For example, it is possible to set ψi=(1+dψ(ζ'))*ψ'/n, ζi=ζ'+dζ(ζ')*(2*i−n−1)/(n−1) resulting in only two non-linear functions dψ(ζ'), dζ(ζ'), in each case identical individual delays ψi and individual angle coordinates ζi differing by small steps dζ(ζ')*2/(n−1) from SBC to SBC. Here, too, variations are possible; for example, the term (2*i−n−1)/(n−1) could be replaced by the term sgn ((2*i−n−1)/(n−1)) which generally provides for a slightly smaller amounts of dζ, dψ.

It may be appropriate, for example in the case of use in compensators of polarization mode dispersion, not to implement a Soleil Babinet compensator (SBC) which can convert circular polarizations into one another under any phase angle differences, but to implement a polarization transformer which does this for other polarizations, for example linear polarizations. A simple possibility of achieving this is supplementing the polarization transformer according to the invention for one further polarization actuator each, for example one further Soleil Babinet compensator each, at the input, that is to say before the SBC1, and at the output, that is to say after SBCn. These further SBCs are preferably constructed as quarter wave plates with respect to linear eigenmodes. If n=2, this can be implemented by means of an arrangement according to FIG. 1, where SBC2, SBC3 take over the function of the previous SBC1, SBC2 (n=2), the SBC1, SBCn drawn are now the SBCs added at the input and at the output and SBC1' . . . SBCn' can be omitted. If the eigenmodes of the added polarization actuator are linear with an angle of elevation ±45° which can be forced by appropriate drive, the supplemented polarization transformer behaves like a Soleil Babinet analog which can convert TE and TM polarizations into one another under any phase angle differences. If the eigenmodes of the added polarization actuators are linear with an angle of elevation of 0°, 90° which can be forced by appropriate drive, the supplemented polarization transformer behaves like a further example of a GSBA which can convert linear polarizations with an angle of elevation of ±45° into one another under any phase angle differences. An arrangement in which SBC1, SBC2 of the present invention are supplemented by preceding and following SBCs as described is also shown in FIG. 1 of German patent application 19918369.4.

The method according to the invention can also be applied to polarization transformers and PMD compensators in LiNbO$_3$ with X section and Y direction of propagation and to similar polarization transformers, for example to those described in Proc. Fourth European Conference on Integrated Optics ECIO 87, Glasgow, Scotland, pp. 115–118; the former are known from IEEE J. Quantum Electronics 18(1982)4, pp. 767–771, from German patent application P19830990.2 and from Electronics Letters 35(1999)8, pp. 652–654. Assuming a component length which is equal to an integral number of beat wavelengths between the TE-TM eigenmodes of a birefringent waveguide which, as a rule, is an assumption which is insignificant for an implementation, they have eigenmodes which can be endlessly varied on the S2-S3 great circle of the Poincaré sphere. They can convert TE input polarization into TM output polarization. and conversely, with any and endlessly selectable phase angle differences between converted and unconverted wave. This phase angle difference, in turn, forms an angle coordinate, which defines the position of an eigenmode, on a great circle of the Poincaré sphere, here of the S2-S3 great circle. Because of the analogy to the electrooptical Soleil Babinet compensators described above, these polarization actuators are called Soleil Babinet analogs, briefly SBA, here and have been called that in IEEE J. Lightwave Technology 17(1999)9, pp. 1602–1616. As control signals, these SBAs need two or, in the case of certain embodiments according to P19830990.2, three or in the case of an embodiment of Proc. Fourth European Conference on Integrated Optics, ECIO 87, Glasgow, Scotland, pp. 115–118, many voltages which are proportional to ψ*cos(ζ+αk), possibly with respect to an offset, where ψ is again the delay—assuming, or recalculated to, an integral number of beat wavelengths between the eigenmodes of the undisturbed waveguide—ζ again is the angle coordinate and αk is an angle which is characteristic of a certain electrode k and the longitudinal position of which is used to determine modulo the number of beat wavelengths located from the input of the polarization actuator and electrode position.

Apart from SBCs and SBAs, the method according to the invention can also be applied to all other polarization actuators and transformers which are similarly described mathematically. This includes, in particular, all GSBAs. This is because it is sufficient that the Müller matrices of such components can be transformed into those of SBCs by orthogonal transformation or their Jones matrices can be converted into the Jones matrices of SBCs by unitary transformations. For example, the combination of TE-TM phase shift and TE-TM mode conversion with fixed phase between unconverted and converted wave is possible and the eigenmodes can be selected arbitrarily on a great circle of the Poincaré sphere intersecting the S1 axis.

Finally, the application of the method: according to the invention in the implementation of an endless elliptical retarder ER which at least approximately operates in an ideal manner will be explained. From IEEE J. Lightwave Technology, 17(1999)9, pp. 1602–1616, it is known that an ER can be formed, for example, from a Soleil Babinet compensator with a delay which can be selected between 0 and π and a Soleil Babinet compensator, which is arranged before and after it with a delay π, in which arrangement the angle coordinates of both SBCs are endlessly (i.e. without interruption) variable.

For this purpose, the method according to the invention is applied to SBC1 to SBCn from FIG. 1 as described above. In FIG. 1, however, further SBCs follow, namely SBC1' to SBCn'. The method according to the invention is also applied to these, such that an SBC or SBA, called SBC' or SBA' in FIG. 1, with delay π and arbitrarily selectable angle coordinates is implemented by SBC1' to SBCn'. In this manner, an at least approximately ideal ER is implemented by SBC and SBC' or SBA and SBA'. In FIG. 1, the polarizations P0', P12', P23', P34', P4' have the same meanings for SBC', SBA' as P0, P12, P23, P34, P4 for SBC, SBA.

What is claimed is:

1. A method for polarization control of an optical signal, comprising:

converting a polarization of the optical signal using polarization acutuators, with arbitrary, freely and interruption free selectable individual phase angle differences as individual angle coordinates, at least partially into a respective orthogonal, which together form a polarization transformer with a total delay and a total phase angle difference as a total angle coordinate between the polarization and a respective orthogonal, in which an individual angle coordinate is varied as a function of another angle coordinate, wherein the amount ($|d\zeta 1|$, $|d\zeta 2|$, $|d\zeta|$, $|d\zeta^*(2^*i-n-1)/(n-1)|$) of the variation ($d\zeta 1$, $d\zeta 2$, $d\zeta$, $d\zeta^*(2^*i-n-1)/(n-1)$) of an individual angle coordinate is limited for sequences of desired polarization transformations.

2. The method as claimed in claim 1 wherein in total delays individual delays support each other in effects by the limitation of the amount ($|d\zeta 1|$, $|d\zeta 2|$, $|d\zeta|$, $|d\zeta^*(2^*i-n-1)/(n-1)|$) of the variation ($d\zeta 1$, $d\zeta 2$, $d\zeta$, $d\zeta^*(2^*i-n-1)/(n-1)$).

3. The method as claimed in claim 1, the another angle coordinate is the actual or attempted total angle coordinate or an attempted individual angle coordinate.

4. The method as claimed in claim 1, wherein a number of individual angle coordinates are varied as a function of the another angle coordinate.

5. The method as claimed in claim 4, wherein, at least in the case of equal attempted individual angle coordinates, one of the variations of individual angle coordinates is equal to the negative of another one of the variations or equal to zero.

6. The method as claimed in claim 1, wherein at least one of the individual delays is varied as the function of another angle coordinate.

7. The method as claimed in claim 6, wherein one of the variations of the individual delays is equal to another one of the variations or equal to zero, at least in the case of equal attempted individual delays.

8. The method as claimed in claim 1, further comprising applying the method, to at least two additional polarization actuators, which are located before or after the polarization actuators in the beam path to produce another polarization transformer and form an elliptical retarder.

9. The method as claimed in claim 8, wherein one of the polarization actuators operates as an electrooptical Soleil Babinet compensator which can convert circular polarizations at least partially into one another.

10. The method as claimed in claim 1, wherein at least two additional polarization actuators produce an additional polarization transformer which form an elliptical retarder with the polarization transformer.

11. The method as claimed in claim 1, wherein at least one of the polarization actuators operates as an electrooptical Soleil Babinet compensator, the polarizations which are at least partially converted being circular polarizations.

12. The method as claimed in claim 1, wherein at least one of the polarization actuators operates as an electrooptical Soleil Babinet analog, the polarizations which are at least partially converted being TE and TM polarizations.

* * * * *